73-629 SR

7/5/83 OR 4,391,144

United States Patent [19]

Diederichs

[11] 4,391,144

[45] Jul. 5, 1983

[54] ULTRASONIC TEST PROBE

[75] Inventor: Rolf Diederichs, Hürth-Hermülheim, Fed. Rep. of Germany

[73] Assignee: Krautkramer-Branson, Inc., Stratford, Conn.

[21] Appl. No.: 205,303

[22] Filed: Nov. 10, 1980

[30] Foreign Application Priority Data

Mar. 12, 1979 [DE] Fed. Rep. of Germany ....... 2948552

[51] Int. Cl.$^{3}$ ............................................. G01N 29/04

[52] U.S. Cl. ......................................... 73/629; 73/632

[58] Field of Search .................................. 73/629, 632

[56] References Cited

U.S. PATENT DOCUMENTS 3,620,070 11/1971 Collins ................................. 73/629

3,884,325 5/1975 Cowles ................................. 73/632

3,989,963 11/1976 Giaccardi ............................. 73/632

4,114,457 9/1978 Thun .................................... 73/632

FOREIGN PATENT DOCUMENTS 2415040 10/1974 Fed. Rep. of Germany .

1415973 12/1975 United Kingdom .

*Primary Examiner*—Anthony V. Ciarlante

*Attorney, Agent, or Firm*—Ervin B. Steinberg; Philip J. Feig

[57] ABSTRACT

An ultrasonic test probe comprises a transducer and an electrical circuit, particularly means for generating the high voltage transmit pulse to the transducer, all disposed within the probe housing. The high voltage transmit pulse is produced by current flow through an electrical inductor. Other circuit components are also arranged within the probe housing.

2 Claims, 4 Drawing Figures

TRANSMIT PULSE GENERATOR

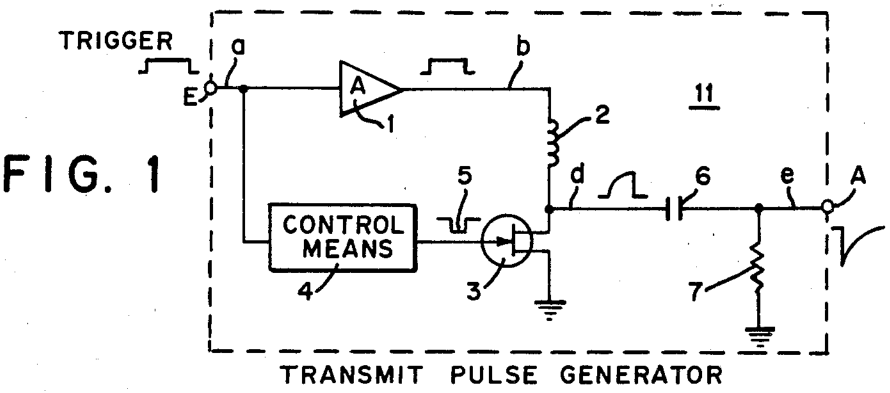
FIG. 1
FIG. 2
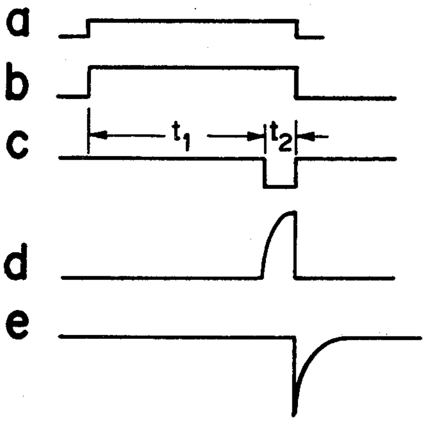
FIG. 4
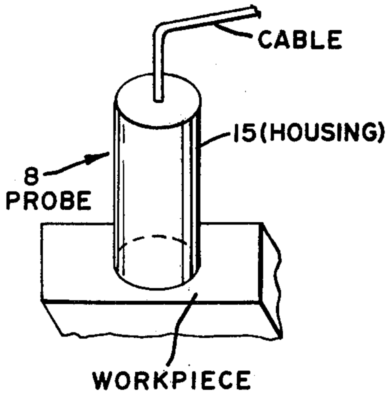
FIG. 3
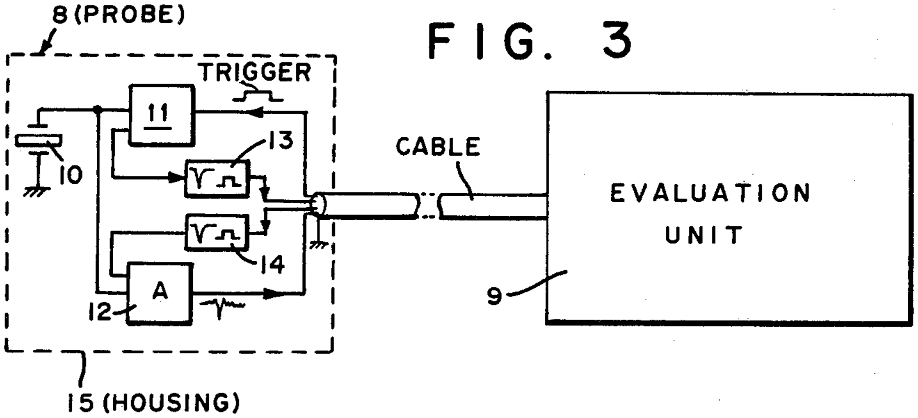

ULTRASONIC TEST PROBE

BRIEF SUMMARY OF THE INVENTION

This invention relates to an ultrasonic test probe comprising an ultrasonic transducer and other operating circuits enclosed within a common housing.

A test probe of this kind is known and shown in U.S. Pat. No. 3,620,070 issued to J. T. Collins on Nov. 16, 1971 entitled "Ultrasonic Material Tester." Operational circuits incorporated in this known probe comprise a preamplifier and a power supply for energizing the preamplifier.

In cases where long cables are used between the test probe and the ultrasonic signal evaluating unit, e.g. when testing nuclear reactors, it is desirable to incorporate not only the preamplifier, but other circuits required for ultrasonic testing in the probe so that the effect of the cables (and interfering radiation) on the transmission and reception of signals is minimized.

It is therefore an object of this invention to provide an ultrasonic test probe which, in addition to the known circuits, contains other operating circuits in order to minimize the effect of electrical interference caused by relatively long connecting cables between the test probe and the ultrasonic signal evaluation unit.

Another important object of this invention is the provision of a test probe which, incorporating the above stated circuits, is neither excessively large nor difficult to handle when performing ultrasonic testing.

To this end, according to the invention, a unit in the form of at least one circuit for generating electrical transmission pulses is incorporated in the test probe, the high voltage transmission signal required being generated in the test probe itself by means of an electrical inductor.

It has been found particularly advantageous to use VMOS field-effect transistors as the switching component in the transmission pulse generating circuit.

Further important details and advantages of the present invention will be apparent from the following specification when read in conjunction with the accompanying drawings.

BRIEF DESCRIPTION OF THE DRAWINGS

FIG. 1 is a circuit according to the invention for generating electrical transmission pulses;

FIG. 2 is a pulse diagram relating to FIG. 1;

FIG. 3 is a schematic diagram showing a test probe with an ultrasonic transducer, a preamplifier, transmitter, and transmitter monitoring unit, and FIG. 4 is a perspective view of the ultrasonic test probe applied to a workpiece.

DETAILED DESCRIPTION OF THE INVENTION

Referring now to the figures, FIG. 1 shows an amplifier 1, an electrical inductor 2, a VMOS-FET transistor 3, and a control unit 4. The transmitter or trigger pulse at input E (see FIGS. *2a–2e*) is fed to the inductor 2 via amplifier 1 and causes a magnetic field to be produced during the time interval $t_1$ (see FIG. *2c*), and to the control unit 4. A pulse 5 of width $t_2$ is produced by the control unit 4 after the passage of time interval $t_1$. The pulse 5 causes the VMOS transistor 3 to be rendered non-conductive so that an induced voltage ($E_{ind}=-L \cdot di/dt$; see FIG. *2d*) is formed across the inductor 2 thereby charging the capacitor 6. The transistor 3 is rendered conductive again after expiration of the time interval $t_2$. Capacitor 6 charged by the voltage across the inductor is discharged through the transistor 3 upon the transistor being rendered conductive and a transmission pulse with a steep leading edge as shown in FIG. *2e* is obtained across resistor 7, at terminal A.

The amplifier 1 is intended to amplify the trigger pulse to a value of e.g. 15 V. In the simplest case, this amplifier is a semiconductor switch which connects an external voltage supply to, or disconnects it from, the inductor 2.

The time interval $t_1$ should advantageously be so selected that the magnetic field generated by the inductor has the maximum value possible.

It must be kept in mind that the high voltage supply is required to provide transmission pulses at specific predetermined time intervals. Consequently, the time interval $t_1$ cannot be made arbitrarily large. Advantageously, therefore, the inductance value L of inductor 2 is selected for a predetermined value of $t_1$ such that the induced voltage reaches a maximum value. Tests have shown that this applies in the case of $$L=0.8\, t_1 \cdot R_V$$

wherein $R_V$ denotes the non-reactive impedance of the inductive circuit.

The time $t_2$ is advantageously selected such that the switch 3 closes when the maximum value of the voltage has been reached (see FIG. *2d*).

In an illustrative embodiment the negative voltage amplitude at the terminal A is 170 V, with selected values of $L=390\ \mu H$, $t_1=21\ \mu s$, $t_2=2\ \mu s$ and $C=4$ nF.

Of course, higher voltages (about 400 V or 700 V), can be produced by correspondingly different values of $t_1$, $t_2$, C and L. However the fast-action VMOS transistor must then have the required breakdown voltage.

In comparison with known transmitter circuits (see for instance J. and H. Krautkramer "Ultrasonic Testing of Materials" (book), 2nd edition, Berlin, Heidelberg, New York 1977, page 202 et seq.), the above-described circuit has the advantage, in respect of it being disposed within the test probe housing, that there is no need for feeding high voltage from the evaluation unit to the test probe, and the effect of the cable upon the pulse shape of the electrical transmit pulse is eliminated. Although transistor circuits are commercially available in which the transmitter high voltage for charging the capacitor C (FIG. 1) is generated by the transmitter circuit itself, these prior art units utilize a transformer with primary and secondary windings for the voltage step up. The physical size of these transformers and the power loss of the circuit, and hence the cooling surfaces required, are so large that for these reasons it is impossible to incorporate the known transmitter circuits in the test probe housing (the volume of the inductive element is only about one-thirtieth, and the power loss of the circuit is only about one-fifth of the corresponding values of comparable transformers and circuits).

As illustrated in FIG. 3, other circuits in addition to the transmitter 11 and a receiver preamplifier 12 (see Collins supra) can be incorporated in the test probe housing 15 without the latter having to be significantly enlarged. Aside from the piezoelectric transducer element 10 normally contained in the probe housing, the transmitter circuit 11 and the receiver preamplifier 12 mentioned above, the figure also illustrates the presence of a transmitter monitoring unit 13 and a receiver monitoring unit 14 disposed within the housing 15 of the test probe 8. FIG. 4 illustrates the ultrasonic test probe 8 coupled via a cable to the signal evaluation unit 9.

The transmitter monitoring unit 13 is basically a pulse shaping stage (e.g. a monostable multivibrator stage). A portion of the output voltage of the transmitter circuit 11 is fed to this stage, and a square pulse then appears at its output and is fed to the evaluation unit 9 where a monitoring unit indicates that the transmitter is in operation. The magnitude of the corresponding monitoring signal can also be used to monitor the stability of the transmitter.

In the receiver monitoring unit 14, a square wave signal from the evaluation unit 9 is converted to an ultrasonic-like signal and fed to the preamplifier 12 and thus monitored at the evaluation unit.

What is claimed is:

1. An ultrasonic test probe comprising a housing in which is disposed:

(a) a piezoelectric transducer element adapted to transmit an ultrasonic seach pulse into a workpiece and to receive ultrasonic echo signals from such workpiece;

(b) an electrical circuit coupled to said transducer element for periodically energizing said transducer element with a high voltage pulse, said circuit including;

(i) an electrical inductor coupled with one of its two terminals for receiving a trigger pulse;

(ii) an electrical switching means coupled serially between the other terminal of said inductor and ground potential;

(iii) control means coupled to said switching means and controlled by said trigger pulse for periodically rendering said switching means briefly non-conductive when said switching means is in its conductive state;

(iv) a capacitor coupled with one of its two terminals to the junction between said inductor and said switching means, and (v) a resistor coupled with one of its two terminals to ground potential and with its other terminal to the other terminal of said capacitor, whereby responsive to the provision of a trigger pulse said control means renders said switching means non-conductive to cause a high voltage signal to form across said inductor which charges said capacitor with a potential, and responsive to said control means subsequently rendering said switching means conductive said capacitor discharges its potential to provide a high voltage pulse across said resistor which pulse is applied to said transducer element to energize said element.

2. An ultrasonic test probe as set forth in claim 1, said switching means comprising a VMOS field effect transistor.

* * * * *